(12) United States Patent
Tang et al.

(10) Patent No.: US 11,613,328 B2
(45) Date of Patent: Mar. 28, 2023

(54) HULL AUXILIARY MECHANISM FOR REDUCING THE DRAFT OF A HULL

(71) Applicants: Xuming Tang, Bengbu (CN); Qingyun Chang, Bengbu (CN)

(72) Inventors: Xuming Tang, Bengbu (CN); Qingyun Chang, Bengbu (CN); Anding Liu, Bengbu (CN); Xiucai He, Bengbu (CN)

(73) Assignees: Xuming Tang, Bengbu (CN); Qingyun Chang, Bengbu (CN)

( * ) Notice: Subject to any disclaimer, the term of this patent is extended or adjusted under 35 U.S.C. 154(b) by 351 days.

(21) Appl. No.: 17/049,582

(22) PCT Filed: Oct. 29, 2019

(86) PCT No.: PCT/CN2019/114008
§ 371 (c)(1),
(2) Date: Oct. 22, 2020

(87) PCT Pub. No.: WO2021/056674
PCT Pub. Date: Apr. 1, 2021

(65) Prior Publication Data
US 2022/0388605 A1 Dec. 8, 2022

(30) Foreign Application Priority Data

Sep. 27, 2019 (CN) .......................... 201910926801.3

(51) Int. Cl.
*B63B 1/04* (2006.01)
(52) U.S. Cl.
CPC .......... *B63B 1/04* (2013.01); *B63B 2001/045* (2013.01)

(58) Field of Classification Search
CPC ....... B63B 1/04; B63B 2001/045; B63B 1/16; B63B 1/20; B63B 1/22; B63B 1/30; B63B 1/286; B63B 2001/183
USPC ........ 114/271, 274, 280, 282, 284, 285, 288
See application file for complete search history.

(56) References Cited

U.S. PATENT DOCUMENTS

| | | | | |
|---|---|---|---|---|
| 8,955,452 | B1 * | 2/2015 | Wilson | B63B 1/22 114/61.1 |
| 2009/0227159 | A1 * | 9/2009 | Meyer | B63B 1/14 114/284 |
| 2021/0387699 | A1 * | 12/2021 | Castelli | B63B 1/14 |

FOREIGN PATENT DOCUMENTS

| | | | | |
|---|---|---|---|---|
| CN | 101249873 | A | * | 8/2008 |
| JP | 2562084 | B2 | * | 11/1996 |

* cited by examiner

*Primary Examiner* — Anthony D Wiest
(74) *Attorney, Agent, or Firm* — Bayramoglu Law Offices LLC

(57) ABSTRACT

A hull auxiliary mechanism for reducing a draft of a hull, includes a guide baffle on both sides of the hull. Two ends of the guide baffle extend out of a front end and a rear end of the hull. A Lower end of the guide baffle extends out of a bottom of the hull. The front end and the rear end of the hull are flat inclined plates. The bottom of the hull is a flat plate; the hull auxiliary mechanism also includes a water resistance mechanism, and the water resistance mechanism includes a first diversion pressure plate, a second diversion pressure plate and a third diversion pressure plate. Both sides of the guide baffle are used to direct a flow of water to the hull. At the same time, there are three groups of diversion pressure plates at the bottom of the hull.

5 Claims, 4 Drawing Sheets

HULL AUXILIARY MECHANISM FOR REDUCING THE DRAFT OF A HULL

CROSS REFERENCE TO THE RELATED APPLICATIONS

This application is the national stage entry of International Application No. PCT/CN2019/114008, filed on Oct. 29, 2019, which is based upon and claims priority to Chinese Patent Application No. 201910926801.3, filed on Sep. 27, 2019, the entire contents of which are incorporated herein by reference.

TECHNICAL FIELD

The invention relates to the technical field of ships, in particular to a hull auxiliary mechanism for reducing the draft of a hull.

BACKGROUND

The draft of a ship generally refers to the depth of the ship submerged in the water. It refers to the vertical distance from the bottom of the ship to the connection point between the hull and the water surface. It indirectly reflects the buoyancy (or the weight of the hull and its cargo, as it is equal to the buoyancy of the hull). Therefore, the greater the draft of the hull is, the greater the carrying capacity of the ship is.

The deeper the draft of a hull is, the greater the received resistance is and the greater the energy consumption is, which will also affect the speed. Therefore, when the hull is stable, reducing the draft is conducive to the reduction of energy consumption and the improvement of speed.

SUMMARY

With the technology present, in order to overcome the problem of the draft of a ship in the running process, the invention provides a hull auxiliary mechanism for reducing the draft of a hull.

The technical problem to be solved by the invention is realized by the following technical scheme:

The hull auxiliary mechanism for reducing the draft of a hull includes a guide baffle on both sides of the hull. The two ends of the guide baffle extend out of the front and rear ends of the hull. The lower end of the guide baffle extends out of the bottom of the hull. The front and rear ends of the hull are flat inclined plates. The bottom of the hull is a flat plate;

The auxiliary mechanism also includes a water resistance mechanism, which comprises a first diversion pressure plate, a second diversion pressure plate and a third diversion pressure plate;

The lower end of the first diversion pressure plate is hinged on the inclined plate at the front end of the hull. The first hydraulic cylinder is arranged in the hull. The rod body of the first hydraulic cylinder passes through the inclined plate at the front end of the hull and is hinged to the upper end of the first diversion pressure plate;

The second diversion pressure plate is arranged parallel to the flat plate at the bottom of the hull, and the side close to the front end of the hull is hinged with the flat plate at the hull bottom. The hull is provided with a second hydraulic cylinder, and the rod body of the second hydraulic cylinder is hinged with the other side of the second diversion pressure plate through the flat plate at the hull bottom;

The lower end of the third diversion pressure plate is hinged on the inclined plate at the rear end of the hull. A third hydraulic cylinder is arranged in the hull. The rod body of the third hydraulic cylinder passes through the inclined plate at the rear end of the hull and is hinged with the upper end of the third diversion pressure plate.

Further technology of the invention:

The first, second and third diversion pressure plates are provided with sliding channels. The sliding blocks are arranged in the sliding channels, and the rod body is hinged on the sliding blocks.

Preferably, the auxiliary mechanism also includes a propeller assembly lifting mechanism, specifically including a sliding rail arranged vertically at the rear end of the hull and a vertical sliding plate arranged on the propeller assembly. The cross section of the sliding rail is concave, and the convex clamping strip is arranged on both sides of the concave inner wall. The two sides of the vertical sliding plate are provided with concave grooves. The clamping strip is matched with the groove. The propeller assembly is connected to the winding drum on the hull by a chain. Through the winding drum, the chain can be retracted and released to control the lifting and lowering of propeller assembly.

Preferably, the first hydraulic cylinder, the second hydraulic cylinder and the third hydraulic cylinder are vertically arranged in the hull.

Preferably, the hull is provided with three vertical pipes. The upper ends of the three vertical pipes are respectively used to support the first hydraulic cylinder, the second hydraulic cylinder and the third hydraulic cylinder. The rod body passes through the hull through the interior of the vertical pipe.

Preferably, the upper end of the vertical pipe is higher than the maximum draft of the hull.

The invention has the following technical effects:

The guide baffles on both sides are used to direct the water flow to the hull. At the same time, there are three groups of diversion pressure plates at the bottom of the hull. The angles of the diversion pressure plates are adjusted by the hydraulic cylinders, so as to adjust the water flow at the bottom of the hull, increase the buoyancy of the hull and reduce the draft.

BRIEF DESCRIPTION OF THE DRAWINGS

In order to explain the technical scheme in the embodiment of the invention more clearly, the figures needed in the description of the embodiment will be briefly introduced here. Obviously, the figures in the following description are only some embodiments of the invention. For ordinary technical personnel in the area, other figures can be obtained according to these figures without extra efforts.

Figure 1:
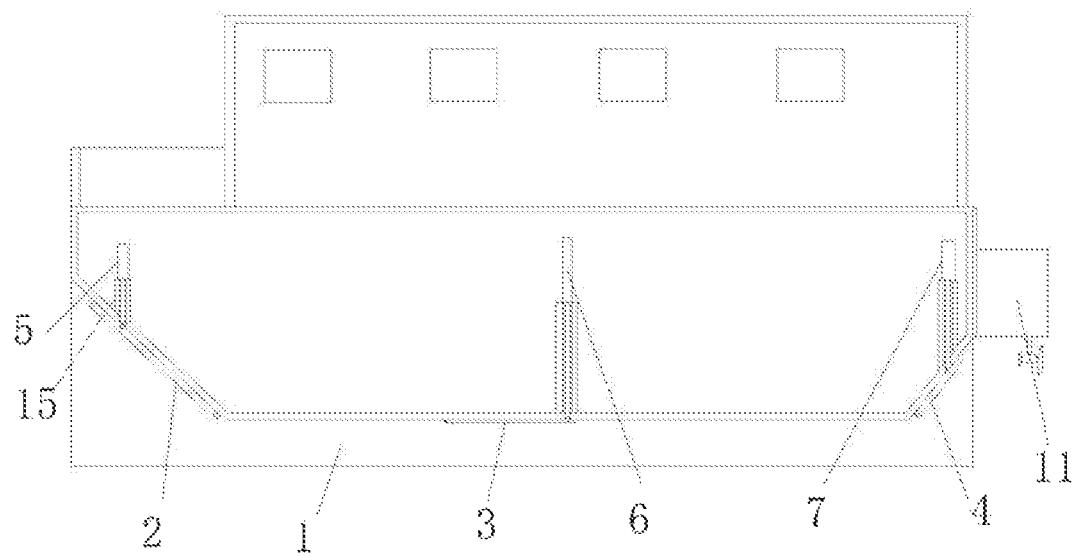
FIG. 1 is a side view diagram of the structure of the invention.
Figure 2:
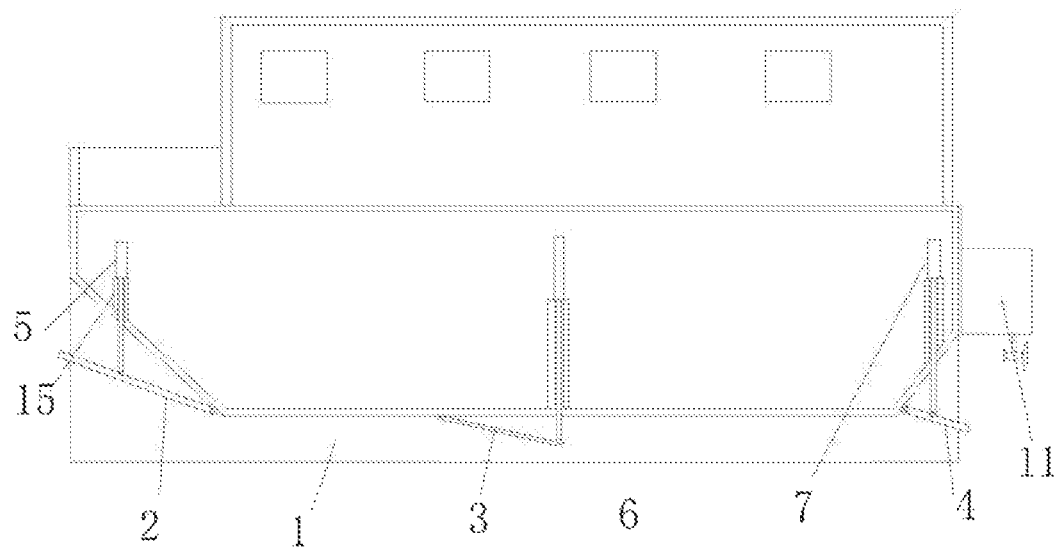
FIG. 2 is the structural diagram of the diversion pressure plate of the invention.
Figure 3:
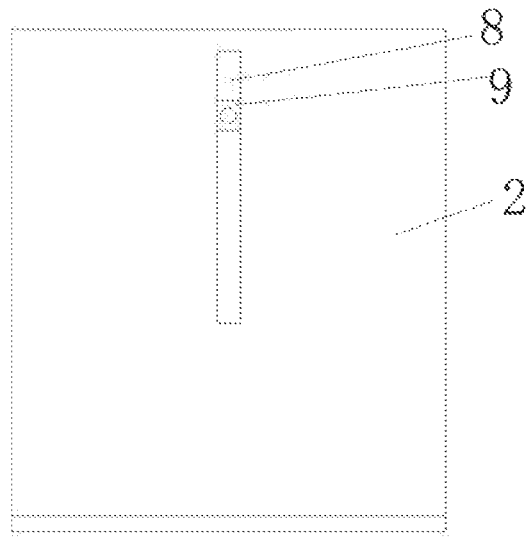
FIG. 3 is the structural diagram of the first diversion pressure plate.
Figure 4:
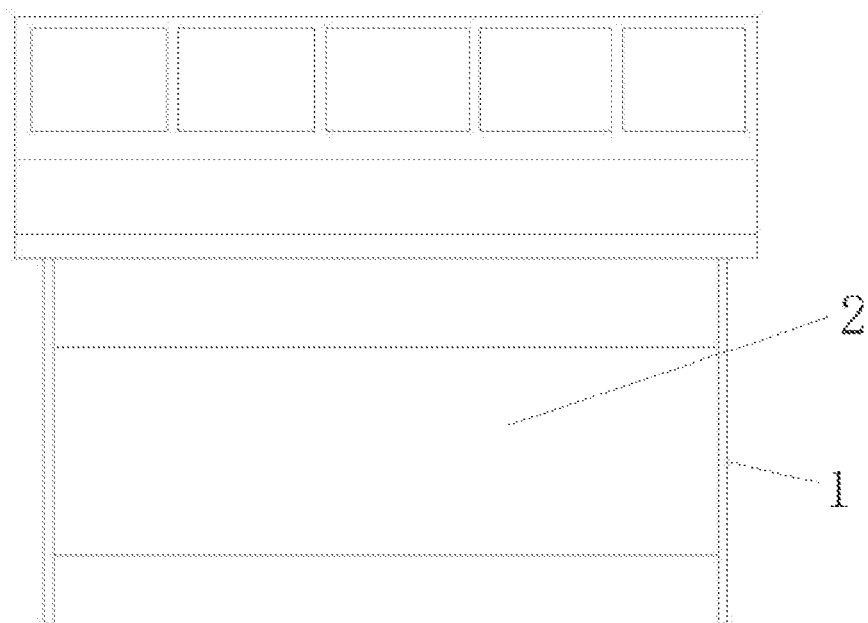
FIG. 4 is a front view diagram of the structure of the invention.
Figure 5:
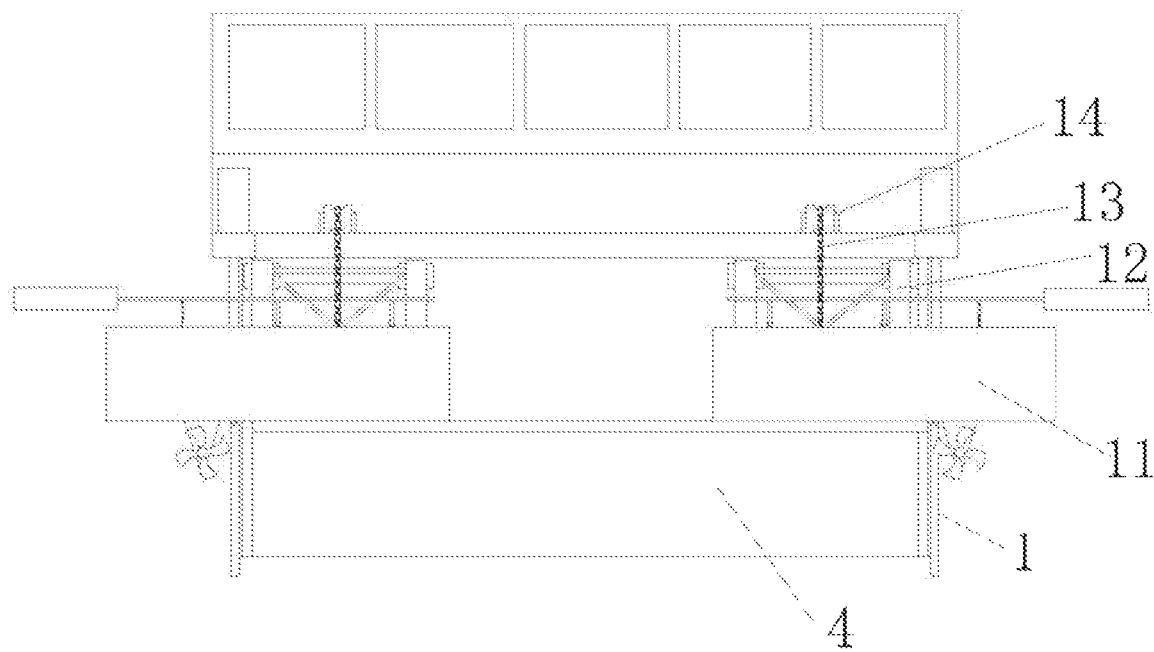
FIG. 5 is the structural diagram of the rear end of the hull.
Figure 6:
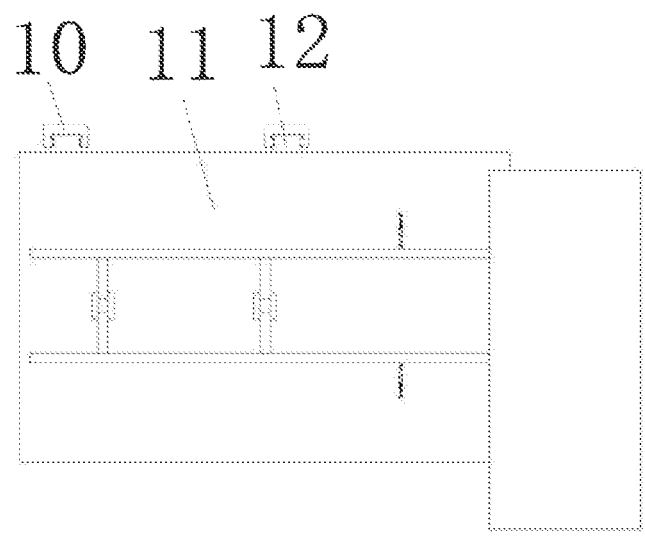
FIG. 6 is the structural diagram of propeller assembly.

The labels in the above figures are as follows: 1. Guide baffle; 2. First diversion pressure plate; 3. Second diversion pressure plate; 4. Third diversion pressure plate; 5. First hydraulic cylinder; 6. Second hydraulic cylinder; 7. Third hydraulic cylinder; 8. Sliding channel; 9. Sliding block; 10. Sliding rail; 11. Propeller assembly; 12. Vertical sliding plate; 13. Chain; 14. Winding drum; 15. Vertical pipe; 16. Rod.

DETAILED DESCRIPTION OF THE EMBODIMENTS

In order to make the purpose, technical scheme and advantages of the embodiment of the invention clearer, the technical scheme in the embodiment of the invention will be described clearly and completely in combination with the embodiment of the invention. Obviously, the described embodiment is a part of the embodiment of the invention, rather than a complete embodiment. Based on the embodiment of the invention, all other embodiments obtained by ordinary technicians in the area without extra efforts belong to the scope of protection of the invention.

Referring to FIGS. 1-6, this embodiment provides a hull auxiliary mechanism for reducing the draft of a hull, including a guide baffle 1 on both sides of the hull. The two ends of the guide baffle extend out of the front and rear ends of the hull. The lower end of the diversion pressure plate extends out of the bottom of the hull. The front and rear ends of the hull are flat inclined plates. The bottom of the hull is a flat plate;

First of all, the water flow is guided to the bottom of the hull through the guide baffles on both sides. The front end of the hull is a flat inclined plate. Water rushes through the bottom of the hull against the flat plate. The water flow at the hull bottom is equal to the water flow outside;

The auxiliary mechanism also includes a water resistance mechanism, which comprises a first diversion pressure plate 2, a second diversion pressure plate 3 and a third diversion pressure plate 4;

Among them, the lower end of the first diversion pressure plate is hinged on the inclined plate at the front end of the hull. The first hydraulic cylinder 5 is arranged in the hull. The rod body of the first hydraulic cylinder passes through the inclined plate at the front end of the hull and is hinged with the upper end of the first diversion pressure plate;

When the rudder blade and thruster in the stern are too shallow, the rudder efficiency will be reduced, the resistance on the bow will be increased and the operation performance will be poor, which will increase the energy consumption of the ship when it is running. Therefore, the first diversion pressure plate is pressed down through the first hydraulic cylinder to adjust the angle of water flow impact, so that the water can flow into the bottom of the hull more smoothly. During the process from vertical impingement to inclined impingement against the first diversion pressure plate, the buoyancy of the first diversion pressure plate increases continuously, which can lift the bow and reduce the draft of the bow.

The upper end of the first diversion pressure plate is located at the highest draft of the hull, and the upper end of the first diversion pressure plate is always above the water surface.

The second diversion pressure plate is arranged parallel to the flat plate at the bottom of the hull, and the side close to the front end of the hull is hinged with the flat plate of the hull bottom. The hull is provided with a second hydraulic cylinder 6, and the rod body of the second hydraulic cylinder is hinged with the other side of the second diversion pressure plate through the flat plate at the bottom of the hull;

The lower end of the third diversion pressure plate is hinged on the inclined plate at the rear end of the hull. The third hydraulic cylinder 7 is arranged in the hull. The rod body of the third hydraulic cylinder passes through the inclined plate at the rear end of the hull and is hinged with the upper end of the third diversion pressure plate.

The draft of the stern is large, the bow is upwarped and the wind resistance area is increased. Especially when the ship meets cross wind, the bow is greatly affected by the wind, which will offset the rudder effect of the ship. The phenomenon of "rudder searching for wind" is obvious, that is, the ship's maneuverability is poor, and if it is too large, the blind area of the bow will be increased. Therefore, a third diversion pressure plate is added, and the third guide water pressure plate is pressed down, so that the water flows directly through the stern to impact the third diversion pressure plate, just like the first diversion pressure plate;

At the same time, by adjusting the angle of the second diversion pressure plate, the current strength of the water flow impact is changed, and the buoyancy of the hull bottom is increased. The combination of the first, the second and the third diversion pressure plates with the help of guide baffles and the hull structure can increase the buoyancy of the hull and reduce the draft of the hull;

More importantly, the first, second and third diversion pressure plates can be adjusted respectively. When the hull requires the draft of the bow to be greater than the draft of the stern, requires the draft of the hull to be rather deep, or requires the draft to be level, the three diversion pressure plates can also complete it.

The first, the second and the third diversion pressure plates are provided with sliding channels 8, and the sliding blocks 9 are arranged in the sliding channels. The rod body is hinged on the sliding blocks. The length of the sliding channel is the maximum turning angle of the diversion pressure plate and is the length of the sliding block movement.

Preferably, the auxiliary mechanism also includes a propeller assembly lifting mechanism, specifically including a sliding rail 10 arranged vertically at the rear end of the hull and a vertical sliding plate 12 arranged on the propeller assembly 11. The cross section of the sliding rail is concave, and the convex clamping strips are arranged on both sides of the concave inner wall. The two sides of the vertical sliding plate are provided with concave grooves, and the clamping strip is matched with the groove. The propeller assembly is connected to the rewinding drum 14 on the hull through the chain 13, and the rewinding of the chain is completed through the rewinding drum to control the lifting and lowering of the propeller assembly.

After the first, second and third diversion pressure plates reduce the draft of the hull, the rudder blade and thruster in the stern will be too shallow, the rudder efficiency will be reduced, the resistance on the bow will be increased, the operation performance will be poor, and the energy consumption of the ship will be increased. Therefore, the invention also provides a lifting propulsion mechanism which can be used with the first, second and third diversion pressure plates.

A number of positioning holes are arranged on the sliding rail. After the position of the propeller assembly is determined, the positioning pin is inserted into the positioning hole to avoid the propeller assembly from moving up. It can avoid the propeller assembly from moving down by controlling the chain.

At the same time, in the embodiment, a propeller is arranged on both sides of the stern to reduce the impact of the water flow at the hull bottom on the propeller.

The first hydraulic cylinder, the second hydraulic cylinder and the third hydraulic cylinder are vertically arranged in the hull.

The hull is provided with three vertical pipes 15. The upper ends of the three vertical pipes are respectively used to support the first hydraulic cylinder, the second hydraulic cylinder and the third hydraulic cylinder. The rod body passes through the hull through the interior of the vertical pipe.

The upper end of the vertical pipe is higher than the maximum draft of the hull, so as to avoid water flowing into the hull from the upper end of the vertical pipe.

A short rod is arranged between the rod body of the hydraulic cylinder and the diversion pressure plate. The two ends of the short rod are respectively hinged on the rod body and the diversion water plate. The short rod is used for the angle adjustment between the rod body and the diversion pressure plate.

Figure 7:
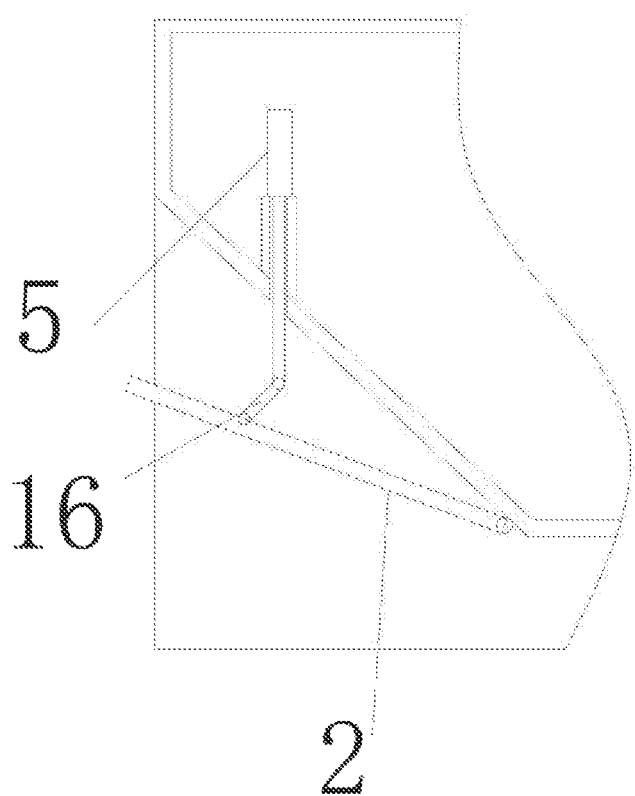
FIG. 7 is the connection diagram of the first hydraulic cylinder and the first diversion pressure plate.

In FIG. 7, a short rod 16 is added between the rod body of the first hydraulic cylinder 5 and the first diversion pressure plate 2.

It should be noted that in this paper, relational terms such as first and second are only used to distinguish one entity or operation from another, and do not necessarily require or imply any such actual relationship or order between these entities or operations. Moreover, the terms "include", "comprise" or any other variation thereof are intended to cover non-exclusive inclusion so that a process, method, article, or equipment that includes a series of elements includes not only those elements, but also other elements not explicitly listed, or those inherent to such process, method, article or equipment. In the absence of more restrictions, the statement "include a . . . " limited element does not preclude the existence of additional identical elements in the process, method, article, or equipment that includes the element.

In the present invention, characteristics are interleaved with each other and do not necessarily exist independently unless there are clear provisions and limitations. The above display and description include the basic principle, main characteristics and advantages of the invention. The technical personnel engaged in the field should know that the present invention is not limited to the limitation of the embodiments mentioned above. The embodiments and specifications mentioned above are only preferred examples of the present invention, rather than being used to limit the invention, so as to become the only choice. Under the spirit and scope requirements of the invention, the invention can be further changed and optimized. The improvement and optimization of the invention are all within the scope of the invention claimed to be protected. The specific scope of protection required by the invention is defined by the attached claims and their equivalents.

What is claimed is:

1. A hull auxiliary mechanism for reducing a draft of a hull, comprising:
   a guide baffle on each side of the hull, and
   a water resistance mechanism;
   wherein
   two ends of the guide baffle extend out of a front end and a rear end of the hull, a lower end of the guide baffle extends out of a bottom of the hull, the front end of the hull is a first flat inclined plate, and the rear end of the hull is a second flat inclined plate, the bottom of the hull is a flat plate;
   the water resistance mechanism comprises a first diversion pressure plate, a second diversion pressure plate and a third diversion pressure plate;
   a lower end of the first diversion pressure plate is hinged on the first flat inclined plate at the front end of the hull, a first hydraulic cylinder is arranged in the hull, a rod body of the first hydraulic cylinder passes through the first flat inclined plate at the front end of the hull and the rod body of the first hydraulic cylinder is hinged to an upper end of the first diversion pressure plate;
   the second diversion pressure plate is arranged parallel to the flat plate at the bottom of the hull, and a first side of the second diversion pressure plate adjacent to the front end of the hull is hinged with the flat plate at the bottom of the hull, the hull is provided with a second hydraulic cylinder, and a rod body of the second hydraulic cylinder is hinged with a second side of the second diversion pressure plate through the flat plate at the bottom of the hull;
   a lower end of the third diversion pressure plate is hinged on the second flat inclined plate at the rear end of the hull, a third hydraulic cylinder is arranged in the hull, a rod body of the third hydraulic cylinder passes through the second flat inclined plate at the rear end of the hull and the rod body of the third hydraulic cylinder is hinged with an upper end of the third diversion pressure plate.

2. The hull auxiliary mechanism according to claim 1, wherein each of the first diversion pressure plate, the second diversion pressure plate and the third diversion pressure plate is provided with a sliding channel, a sliding blocks is arranged in the sliding channel, and each of the rod body of the first hydraulic cylinder, the rod body of the second hydraulic cylinder and the rod body of the third hydraulic cylinder is hinged on the sliding block.

3. The hull auxiliary mechanism according to claim 1, wherein the first hydraulic cylinder, the second hydraulic cylinder and the third hydraulic cylinder are vertically arranged in the hull.

4. The hull auxiliary mechanism according to claim 3, wherein the hull is provided with three vertical pipes, and upper ends of the three vertical pipes are configured to support the first hydraulic cylinder, the second hydraulic cylinder and the third hydraulic cylinder respectively, the rod body of the first hydraulic cylinder, the rod body of the second hydraulic cylinder and the rod body of the third hydraulic cylinder pass through the hull through interiors of the three vertical pipes.

5. The hull auxiliary mechanism according to claim 4, wherein each of the upper ends of the three vertical pipes is higher than a maximum draft of the hull.

* * * * *